Sept. 17, 1957  C. R. JOHNSTON  2,806,436
FREIGHT POSITIONING AND RETAINING APPARATUSES
Filed Aug. 17, 1956  5 Sheets-Sheet 1
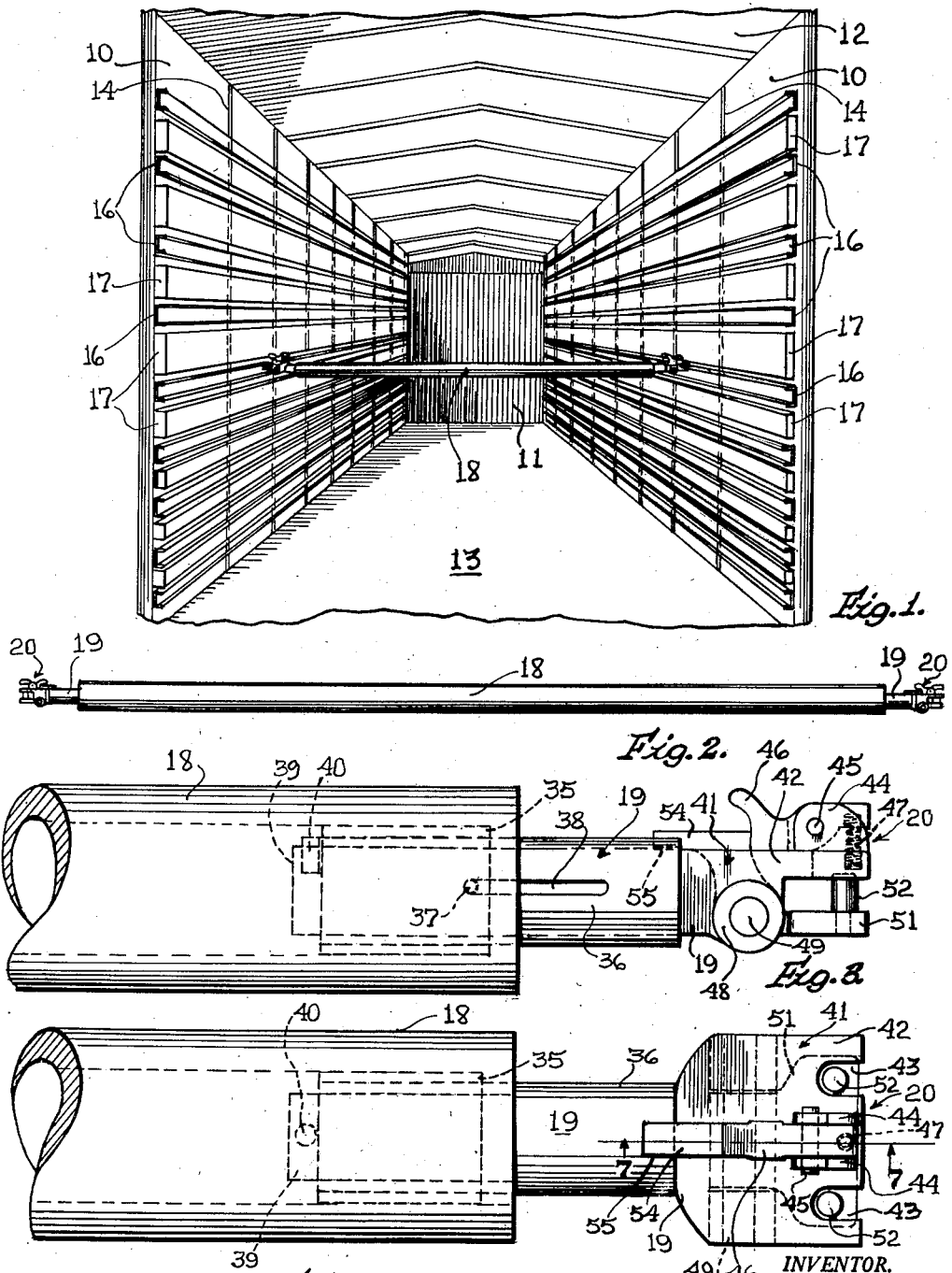
INVENTOR.
C. RICHARD JOHNSTON
BY Thredy & Thredy
HIS ATTORNEYS.

Sept. 17, 1957  C. R. JOHNSTON  2,806,436
FREIGHT POSITIONING AND RETAINING APPARATUSES
Filed Aug. 17, 1956  5 Sheets-Sheet 2
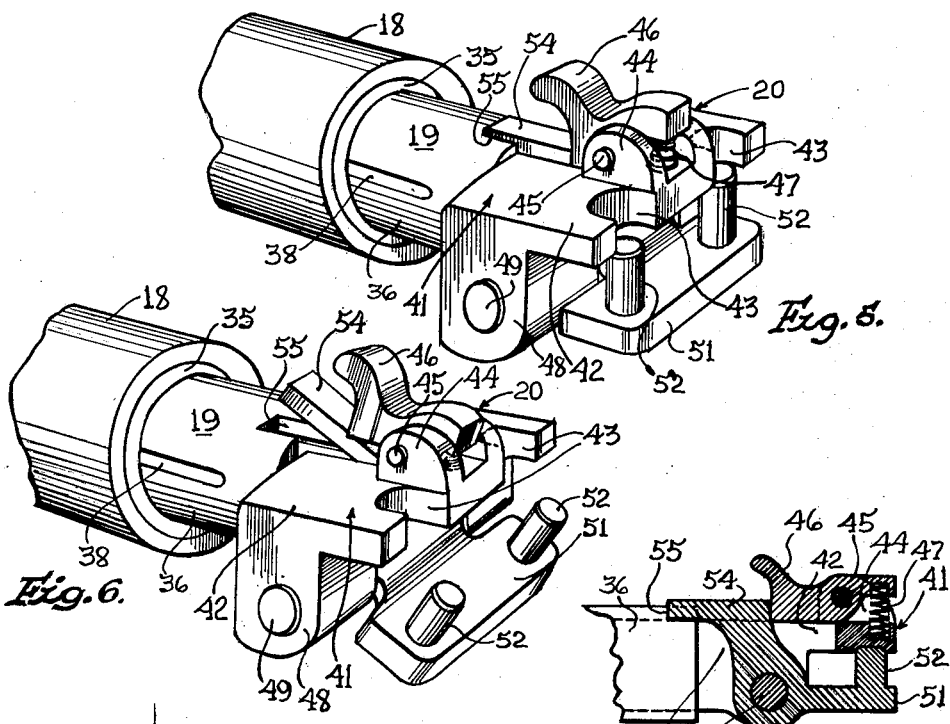
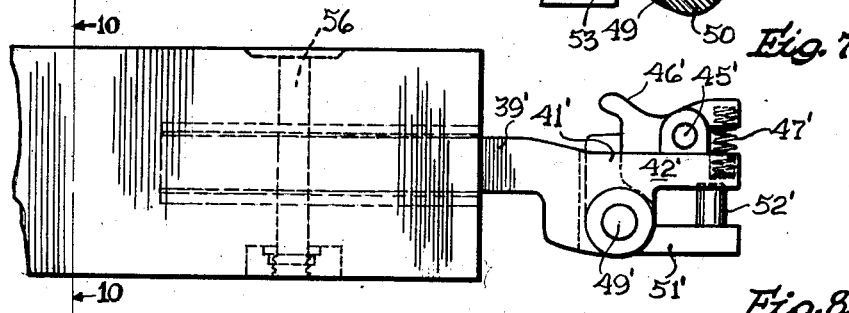
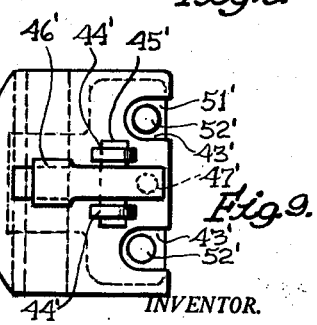
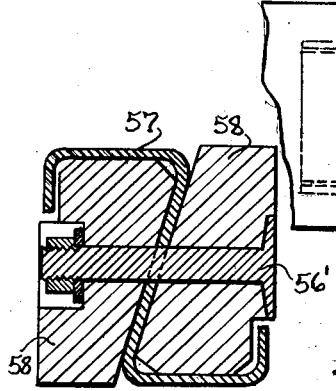
INVENTOR.
C. RICHARD JOHNSTON
BY
HIS ATTORNEYS.

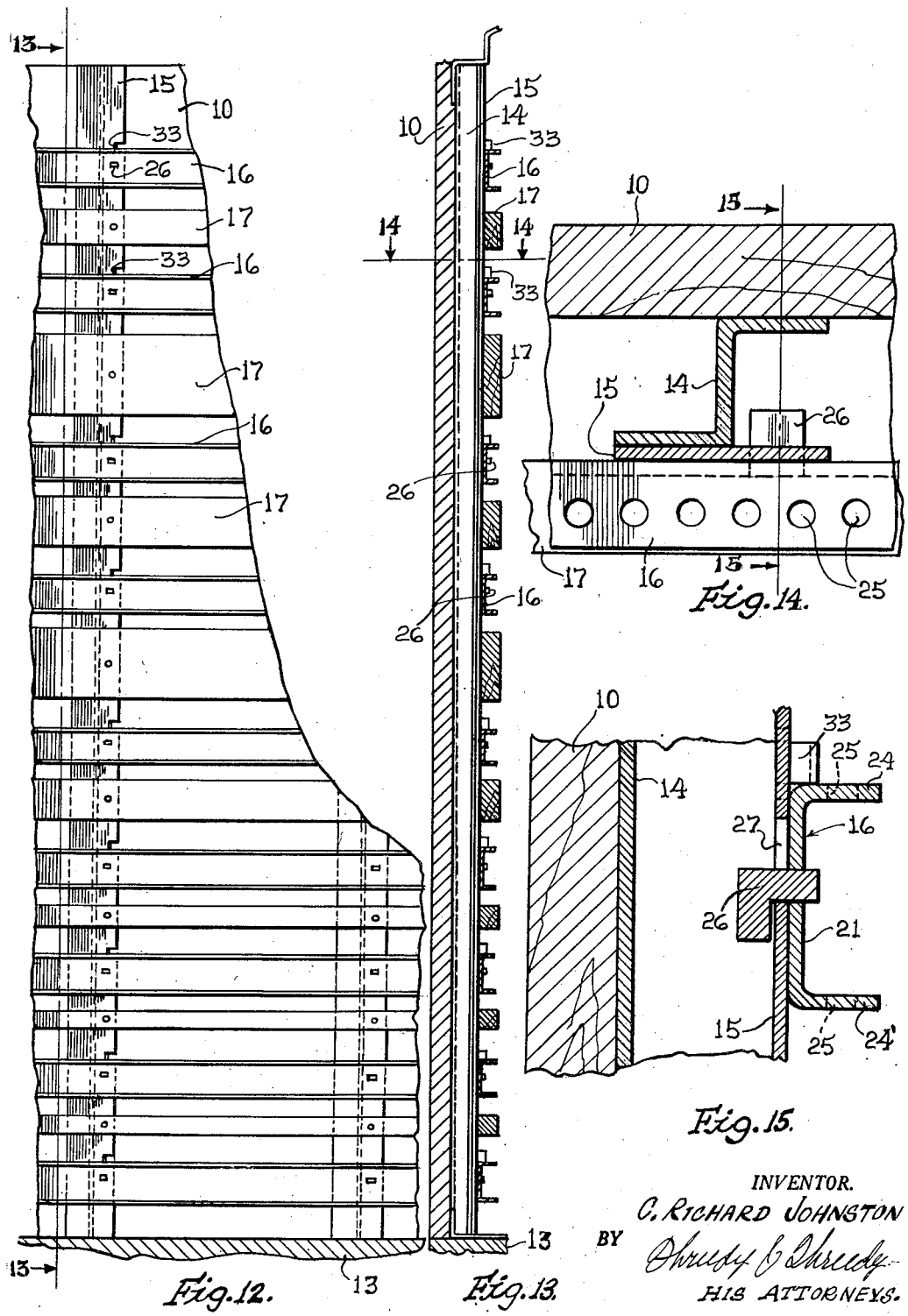

Sept. 17, 1957  C. R. JOHNSTON  2,806,436
FREIGHT POSITIONING AND RETAINING APPARATUSES
Filed Aug. 17, 1956  5 Sheets-Sheet 4

INVENTOR.
C. RICHARD JOHNSTON
BY
HIS ATTORNEYS.

Sept. 17, 1957  C. R. JOHNSTON  2,806,436
FREIGHT POSITIONING AND RETAINING APPARATUSES
Filed Aug. 17, 1956  5 Sheets-Sheet 5
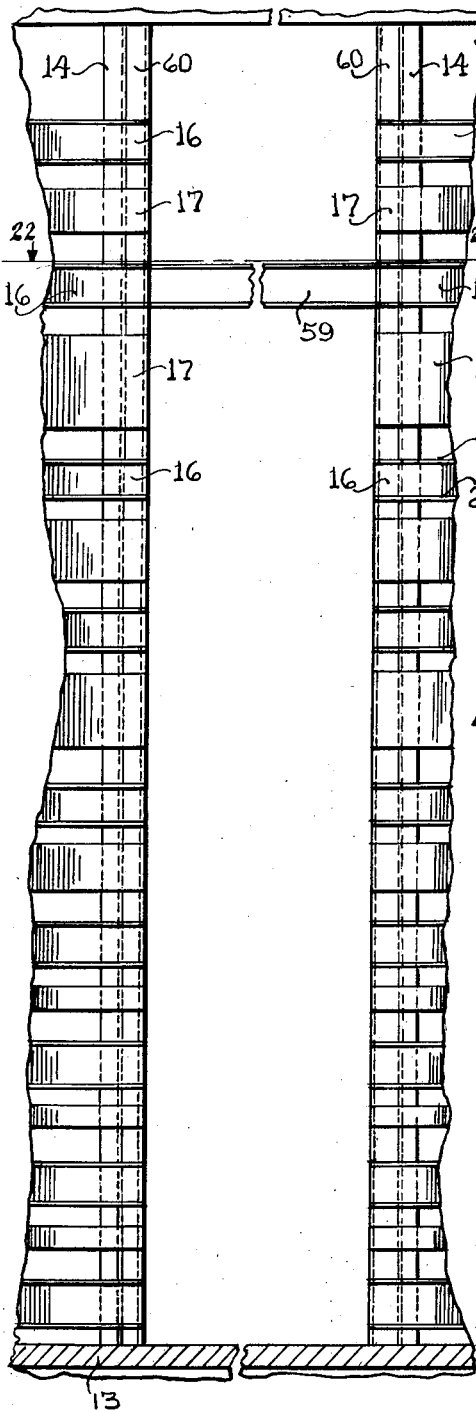
Fig. 21.
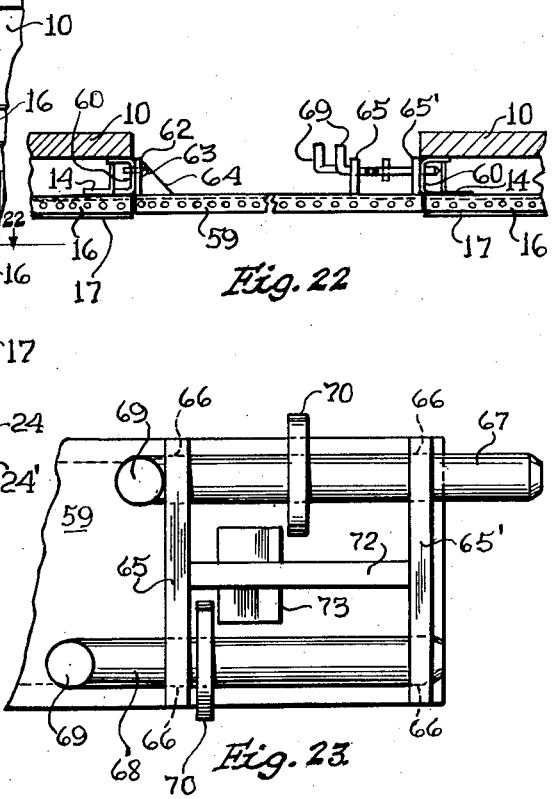
Fig. 22
Fig. 23.
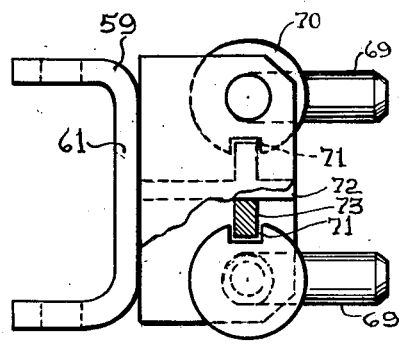
Fig. 24.
INVENTOR.
C. RICHARD JOHNSTON
BY
HIS ATTORNEYS.

United States Patent Office 2,806,436
Patented Sept. 17, 1957

2,806,436

FREIGHT POSITIONING AND RETAINING APPARATUSES

Charles Richard Johnston, Chicago, Ill., assignor to Transportation Specialties Co., Chicago, Ill., a corporation of Illinois Application August 17, 1956, Serial No. 604,674

6 Claims. (Cl. 105—369)

My invention relates to new and useful improvements in freight positioning and retaining apparatuses and has for its principal object the provision in an apparatus of this character of a method whereby a standard freight hauling vehicle may be readily and economically converted into a vehicle which will receive and retain freight of assorted shapes and sizes.

Another object of my invention is the provision in an apparatus of this character of a means for equipping the interior of a freight hauling vehicle with a removable freight positioning and retaining member.

Yet another and equally important object of my invention is in the provision of an apparatus of this character of an improved freight retaining bar which may be easily positioned and adjusted within said freight hauling vehicle.

A further object of my invention is in the provision of an apparatus of this character providing a method for effectively extending the freight positioning and retaining members across the vehicle doors so as to form an uninterrupted supporting member for the freight positioning bars.

Yet another and equally important object of my invention is in the provision of an apparatus of this character whereby the freight retaining bars are constructed so as to have a self-locking head for engagement and cooperation with supporting members removably positioned on the interior walls of the freight hauling vehicle.

A further object of my invention is to provide a freight supporting member which may be installed and/or disassembled with respect to the freight hauling vehicle and which has no effect on the operation, construction or function of the freight hauling vehicle per se.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a fragmentary perspective view of the interior of a freight hauling vehicle showing my present invention and operative position thereof;

Fig. 2 is a perspective view of my improved freight retaining bar;

Fig. 3 is a fragmentary side view of the retaining bar and its improved self-locking head;

Fig. 4 is a fragmentary bottom view of the subject matter disclosed in Fig. 3;

Fig. 5 is a fragmentary perspective view of my improved self-locking head in closed position;

Fig. 6 is a fragmentary perspective view similar to Fig. 5, but showing the self-locking head in open position;

Fig. 7 is a fragmentary detail sectional view taken on line 7—7 of Fig. 4;

Fig. 8 is a fragmentary side view of my modified form of a flat type self-locking head and retaining bar;

Fig. 9 is a fragmentary bottom view of the modified form shown in Fig. 8;

Fig. 10 is a detail sectional view of the retaining bar, taken on line 10—10 of Fig. 8;

Fig. 12 is a fragmentary side elevational view of the interior wall of a freight hauling vehicle improved with my removable freight supporting and retaining means;

Fig. 13 is a side elevational view taken substantially on lone 13—13 of Fig.12;

Fig. 14 is a detail sectional view taken on line 14—14 of Fig. 13;

Fig. 15 is a detail sectional view taken on line 15—15 of Fig. 14;

Fig. 21 is a fragmentary side elevational view of a portion of the supporting members adjacent the door structure (not shown) of the vehicle;

Fig. 22 is a detail sectional view taken on line 22—22 of Fig. 21;

Fig. 23 is a fragmentary rear view of the conecting and locking members employed in my door spannnig member;

Fig. 24 is an end view of the door spanning locking member as shown in Fig. 23.

Figure 16:
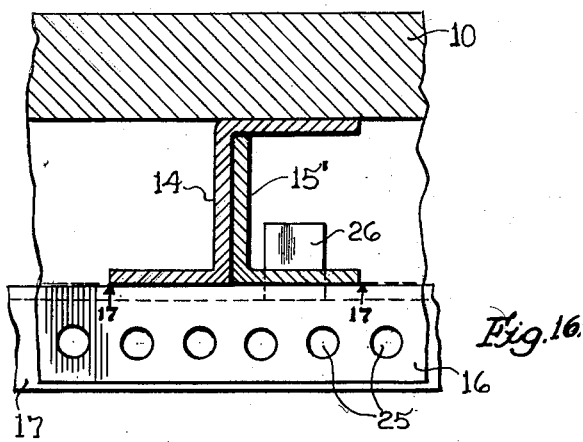
Fig. 16 is a detail sectional view similar to Fig. 14 but showing a modified form.

The hauling of freight of assorted shapes and sizes has established the need for a shipper to simply and conveniently convert the interior of a standard freight hauling vehicle into a specialized design which will accommodate the various sizes and load capacities of the assorted freight to be shipped. The means and method to so convert the interior of the vehicle is the subject matter of this invention.

Referring to Fig. 1, there is shown a fragmentary perspective view of the interior of a freight hauling vehicle having side walls 10, an end wall 11, a roof 12, and floor 13. The side walls 10 are provided with vertical spaced apart Z-shaped structural ribs 14. Removably attached to a plate 15 carried on the inner face of these ribs 14 are sectional longitudinal supporting members 16. These removable supporting members 16 are vertically spaced apart throughout the height of side walls 10, as shown in Figs. 1 and 12. Between these removable supporting members 16 are wood filler blocks 17 of such thickness as to present a flush interior wall to the vehicle. This arrangement and construction is well known in the trade and constitutes no part of my present invention.

Adapted to be removably latched to any of the supporting members 16 is a freight positioning and retaining bar 18. Each free end of such bar 18 is provided with a head 19 which carries a jaw locking structure 20, hereinafter described.

Figure 19:
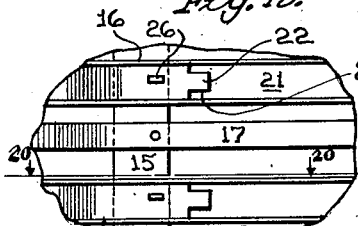
Fig. 19 is a fragmentary view of a method of connecting in a continuous line the supporting members of my invention.
Figure 20:
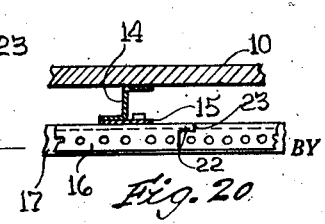
Fig. 20 is a detail sectional view taken on line 20—20 of Fig. 19.

The supporting members 16 are U-shaped in cross section as shown in Figs. 1, 12 and 15. The members 16 are made in assorted lengths and have the bight portion 21 thereof provided at one end with a tongue 22, while the opposite end is formed so as to provide a notched-out portion 23, as shown in Fig. 19. In this manner the opposite ends of each length of the member 16 may be positioned together in perfect horizontal alignment, as shown in Figs. 1 and 12.

Extending laterally from the bight portion 21 of the U-shaped member 16 are spaced apart arms 24 and 24' (Fig. 15). Throughout the horizontal length of the member 16 and in each of the arms 24 and 24' and in vertical alignment with respect to each other and with respect to each of the arms 24 and 24', are formed apertures 25 (Fig. 14). The bight portion 21 is provided with a hook 26 extending rearwardly therefrom in a direction opposite to the direction of the arms 24 and 24'. This hook 26 is adapted to pass through a suitable opening 27 formed in the plate 15 as shown in Fig. 15. Under such a construction, it is readily apparent that the member 16 is removably carried by the plate 15.

In the present arrangement of elements, it should be pointed out that the plate 15 may be secured to the Z-shaped structural ribs 14 either by spot welding or by the use of a nut and bolt arrangement. The openings 27 are located throughout the vertical length of the plate 15 so that the horizontal supporting members 16 can be removably attached thereto in any desired vertical position as shown in Fig. 12.

The plate 15 may be of elongated formation as shown in Fig. 14 so as to have an overlap portion extending in confronting relation with a portion of the Z-shaped structural rib 14, or it may be of the formation shown in Fig. 16. In Fig. 16, the plate 15' consists of an L-shaped angle iron which may be welded or bolted to the middle portion of the Z-shaped structural rib 14, with one end of the angle iron extending in the same plane but in an opposite direction to the exposed portion of the Z-shaped rib 14, as shown in Fig. 16. Either form may be employed and will perform in a like satisfactory manner for purposes of this disclosure.

Referring to Fig. 13, it should be noted that the wood filler blocks 17 are of a thickness equal to the lateral length of the arms 24 and 24', so that there is presented an interior wall that is substantially flush. The wood filler blocks 17 are removably attached to the plates 15 in any suitable manner.

Figure 18:
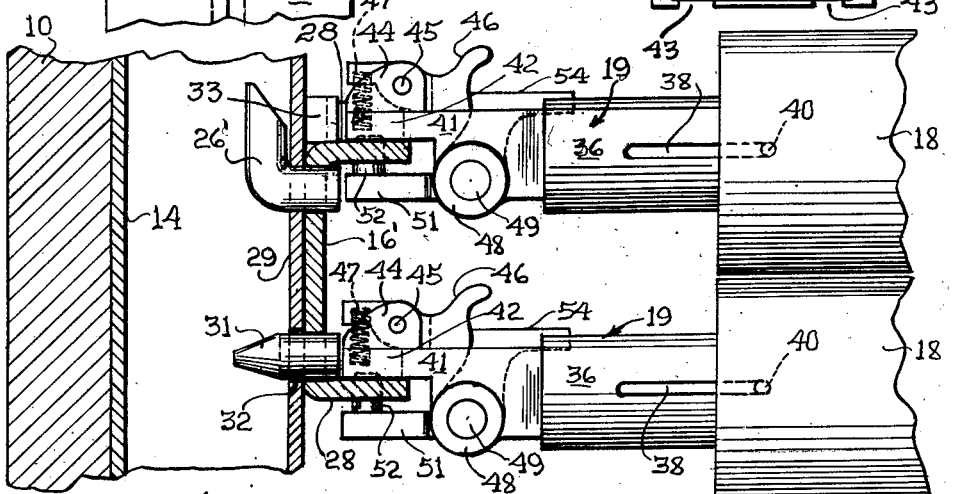
Fig. 18 is a fragmentary side elevational view of a modified form for removably attaching my supporting means to the interior of a freight hauling vehicle.

Fig. 18 discloses a modified form of supporting member 16' wherein the bight portion is provided adjacent the upper of the two lateral arms 23, with a rearwardly and upwardly extending hook 26' adapted to be passed through a suitable aperture formed in a plate 29 similar to plates 15 or 15'. Adjacent the lower laterally extending arm 28 a dowel pin 31 is carried by the bight portion of the supporting member 16'. This dowel pin 31 is adapted to be projected through a positioning aperture 32 formed in the plate 29 in vertical alignment with the aperture which has received the hook 26'. It is readily apparent from the foregoing that this arrangement provides a removable and positive positioning of the supporting member 16' with respect to the plate 29, which is similar in form and construction to the plates 15 and 15' hereinbefore described.

Figure 17:
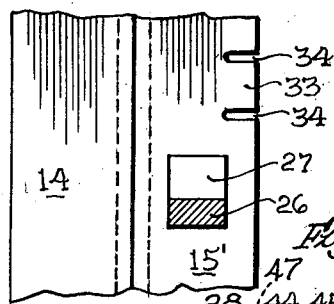
Fig. 17 is a fragmentary side elevational view taken on line 17—17 of Fig. 16.

With regard to the supporting member 16 as shown in Fig. 15 together with its removable attachment to the plate 15, it should be pointed out that the plate 15, as well as the plate 15' or the plate 29, is provided with a latch finger 33 formed by cutting two spaced apart slots 34 inwardly from one of the longitudinal vertical edges of the plate as shown in Fig. 17. This latch finger 33 may then be bent outwardly over the top of the arm 24 of the member 16 so as to removably latch the member 16 to the plate in a preselected position.

By the construction and arrangement of parts hereinbefore described, it is apparent that the entire interior of a freight hauling vehicle may be provided with the supporting members 16 or, by reason of the removable feature of the member 16', any portion less than all of the interior of the vehicle may be so fitted. Such fitting requirements are therefore directly responsive to any type, size, and character of freight to be packed in the vehicle for hauling.

Referring to Figs. 2 through 9, there is disclosed a retaining bar 18 having heads 19 providing jaw locking structures 20. It is these bars 18 that cooperate with the supporting members 16 for positioning and retaining the assorted sizes of freight within the vehicle.

As shown in Fig. 2, the retaining bar 18 is equipped with a head 19 at either end thereof. Each of these heads is of like construction; therefore, I shall describe but one. The head 19, as shown in Figs. 3 to 6, is telescopic as well as rotatable with respect to the bar 18. It should be noted that each of the heads 19 may be rotatable, but that it is preferable that only one be telescopic with respect to the bar 18. The bar 18 at either end is hollowed out to form a recess for the head 19. The bar 18 may be either round or rectangular in cross section and such difference in form will have no effect upon the construction to be hereinafter described. Fitted securely into the recess just previously referred to, is a sleeve 35. Slidable in the sleeve 35 is a casing 36. Extending inwardly of the sleeve 35 is a stop pin 37, the free end of which rides in a slot 38 formed in the periphery of the casing 36. As such, the casing 36 may move in or out of the sleeve 35 a distance equal to the length of the slot 38. Any additional movement is restricted by the pin 37.

Rotatably carried in the casing 36 is a jaw carrying rod 39. The free end of the rod 39 extends beyond the inner end of the casing 36 as shown in dotted lines in Figs. 3 and 4. At this free end of the rod 39 there is an exposed stop pin 40. This pin 40 prevents telescopic movement of the rod 39 relative to the casing 36 but permits the rod 39 to be rotated through the longitudinal length of the casing 36.

The opposite end of the rod 39 is provided with an integral enlarged upper jaw-like structure 41. This structure 41 provides a lateral flat portion 42 extending parallel to the longitudinal axis of the bar 18. The free end of the plate 42 has two spaced apart notched-out portions 43. Intermediate the notches 43 are spaced apart vertically extending ears 44. Journalled between these ears 44 on a suitable shaft 45 is a latch finger 46. The flat plate 42 between the ears 44 provides a hollowed-out recess forming a seat for a spring 47. The outer end of the spring 47 bears against a portion of the latch finger 46, urging the same in a counter-clockwise direction as viewed in Figs. 3, 5, 6 and 7, for purposes hereinafter described.

Figure 11:
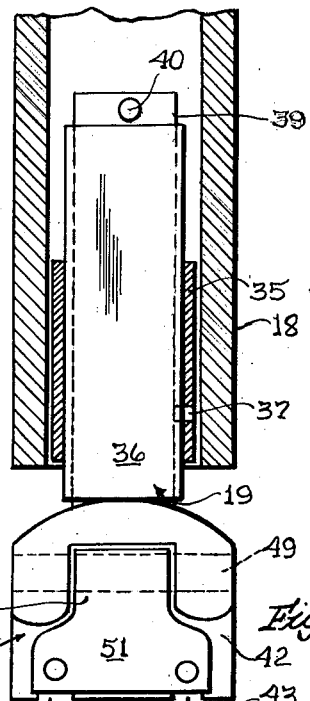
Fig. 11 is a fragmentary sectional bottom view of the retaining bar and locking head.

The plate 42 provides spaced apart depending bosses 48. Between these bosses 48 and rotatably carried by a stud pin 49 is a bearing structure 50 (Figs. 7 and 11) of the lower jaw member 51. The lower jaw member 51 provides vertically extending spaced apart latch teeth 52. The free ends of the teeth 52 are in vertical alignment with and are receivable in the notched-out portions 43 of the plate 42 of the upper jaw structure 41 (as shown in Figs. 3 and 4).

Extending generally upwardly and rearwardly with respect to the member 51 and teeth 52 between the bosses 48 and through an opening 53 formed in the structure 41, is a positioning arm 54 (Fig. 7). This arm 54 has a free end receivable in a recess 55 formed in the end of the casing 36 (Figs. 3 to 7). The lower jaw structure is rotatable about the pin 49 in a clockwise direction, as shown in Figs. 5 and 6. When the structure 51 together with its cooperating elements is in a substantially horizontal position, the free end of the arm 54 is disposed in the recess 55 and will thereby prevent rotation of the head 19 and rod 39 through the longitudinal axis of the casing 36. In such position as shown in Fig. 5, the latch finger 46 is in abutting relation with the free end of the arm 54 and prevents clockwise rotation thereof.

When the latch finger 46 is raised and pivoted against the action of the spring 47, the lower jaw member 51 and its cooperating elements will by gravity pivot about the pin 49 in a clockwise direction as shown in Fig. 6. Such rotation of the lower jaw structure 51 could be accomplished by spring action or through gravity as hereinbefore explained.

In Figs. 8 and 9 I have illustrated a form of retaining bar which has a non-telescopic, non-rotatable head. The head has an upper jaw structure 41' and a lower jaw structure 51' similar in construction to the form shown in Figs. 3 to 6. However, in the illustration as depicted in Figs. 8 and 9, the rod 39' is of a flat design and is attached in a recess formed in the bar, by means of a nut and bolt arrangement 56, both the nut and bolt being countersunk in the sides of the bar to prevent entanglement with freight stored adjacent thereto. This form of bar (Fig. 10) is made up of a Z-shaped iron 57. The Z-shaped iron 57 embraces two sides of two wood inserts 58, and the elements are bolted together as at 56', as shown.

In operation, the freight handler may removably attach a supporting member 16 to each of the ribs 14 throughout the interior of the vehicle, or he may attach the supporting member 16 at such locations as is deemed necessary. The freight is packed or placed within the vehicle and the retainer bar 18 is latched in place. The lower jaw 51 is opened by the operator in the manner hereinbefore described, and the head may be rotated or telescopically adjusted as the need may be and the flat portion 42 may be placed on either of the arms 24 and 24' of the member 16. In such position, the bar 18 may be moved along the length of the member 16. The flat portion 42 thus presents a full flush bearing surface for engagement with the member 16, which bearing surface is the full width of the head 19 and by reason of such size prevents rotation of the head 19 as it is slid along member 16. When the retaining bar 18 occupies the desired position, usually in close proximity to the packed freight, the lower jaw structure 51 is rotated in an anti-clockwise direction so as to project the teeth 52 thereof through the aperture 25 of the member 16 and into closed position with respect to the notched-out portions 43 of the upper jaw section 41, as shown in Fig. 18.

If the packed freight is of sufficient size and weight, it may be desirable to employ two retaining bars and, if so, the second of the bars may be attached to the arm 24', as shown in Fig. 18.

It should be noted that as shown in Figs. 3 to 6, the heads 19 are telescopically arranged with respect to the bar 18 and are only limited in such telescopic movement by the pin 37 carried by the bar 35. In such construction, the pin may move longitudinally of the bar 18 under normal sway of the side walls of the vehicle, and the swaying or pitching of the vehicle will not affect the purpose and function of the retainer bars as hereinbefore described.

As all freight vehicles are provided with some form of door openings, by necessity there must be some structure for bridging such openings. Referring to Figs. 21 to 24, I show a door bridging structure that may be associated with my freight positioning and retaining apparatus.

The structure as shown in Figs. 21 to 24 includes a U-shaped supporting member 59 much like the supporting member 16 hereinbefore described. This member 59 is of a length sufficient to fit between the door posts 60 of the vehicle. To the rear of the bight portion 61 of the member 59 and at either end thereof, I have provided a method for removably connecting the same to the door posts 60. At one end of the member 59 I provide a lateral plate 62. This plate 62 carries a pin 63 which extends in a parallel plane with respect to the length of the member 59. A stress plate 64 is placed between the plate 62 and member 59 to add rigidity thereto. The pin or pins 63 may be positioned into suitable openings formed in the door posts 60 throughout their vertical length.

The opposite end of the member 59 has two spaced apart plates 65 and 65' of a size equal to plate 62 and attached to the rear of the bight portion 61 in the same manner as plate 62.

The two plates 65 and 65' have a pair of apertures 66 formed therein, with the pair of apertures 66 of plate 65 being in horizontal alignment with aperture 66 of plate 65'. Journaled for slidable movement through the aperture 66 are a pair of locking pins 67 and 68. These pins 67 and 68 have right angularly extending handle portions 69 at one end thereof. Intermediate the ends of the pins 67 and 68 and their handle portions 69, I fixedly attach a latch disc 70. These discs 70 have formed in their peripheral edges a cut-out 71. Between the plates 65 and 65' is a spacer bar 72. This spacer bar 72 carries a partial crossbar 73. The crossbar 73 extends laterally to either side of the spacer bar 72 and has its end portions disposed in the path of the discs 70. The cut-outs 71 formed in the discs 70 are of a depth equal to the length of the crossbar 73 which extends in the path of the discs 70.

The arrangement is such that the pins 67 and 68 through their handles 69 may be rotated to line the cut-out portions 71 of each of the discs 70 with the ends of the crossbar 73 so that the pins 67 and 68 and their corresponding discs 70 may be moved relative to the plates 65 and 65'. For example, when the pin 67 is rotated and moved to place its disc 70 between the crossbar 73 and the plate 65', the free end of the pin 67 is insertable into an opening formed in the door post 60. When the handle 69 of pin 67 is rotated out of a horizontal plane, the cut-out portion 71 is rotated out of alignment with the crossbar 73 and the pin 67 is thereby conveniently latched to the post 60, as shown in Fig. 23. The same operation is performed by the pin 68.

The above described arrangement discloses a convenient method for removably attaching a section of a supporting member across a door opening of a freight hauling vehicle.

In the use of such structure, if it be so desired, the supporting members 16 may be continuously attached in a horizontal plane throughout the length of the vehicle, with the supporting member 59 removably spanning the door opening of the vehicle.

While I have illustrated and described the preferred form of construction for carrying my invention into effect, this is capable of variation and modification without departing from the spirit of the invention. I, therefore do not wish to be limited to the precise details of construction set forth, but desire to avail myself of such variations and modifications as come within the scope of the appended claims.

Having thus described my invention, what I claim as new and desire to protect by Letters Patent is:

1. A freight hauling vehicle having side walls supported by vertically extending spaced apart Z-shaped structural ribs, a removable face plate carried by a flange of said Z-shaped rib in spaced verticall parallel relation to said wall with said plate being of a width greater than the flange of said rib so as to provide an over-lap portion, said over-lap portion having apertures formed throughout its vertical length, means removably carried by said face plate for detachably supporting freight retaining bars, said means including a plurality of U-shaped supporting members having spaced apart parallel arms extending laterally therefrom and inwardly and at right angles with respect to said side walls, each of said arms having apertures formed throughout its horizontal length with the apertures of each arm in vertical alignment with respect to each other, a dowel pin carried by the bight portion of the U-shaped member and extending in an opposite direction with respect to said arms thereof, an attaching hook carried by said bight portion of said U-shaped member above and in vertical alignment with respect to said dowel pin, said hook and said dowel pin insertable through preselected apertures of said plate for removably attaching said bight portion of said U-shaped members in facial abutment with said face plate, freight retaining bars having at corresponding opposite ends thereof depending pin members insertable into the apertures of said supporting members for removably latching the ends of said bars to said supporting members, said arms being spaced apart so that each of said arms can releasably support a retaining bar between said side walls with said bars in vertical confronting relation with respect to each other.

2. A freight hauling vehicle having side walls supported by vertically extending spaced apart Z-shaped structural ribs, a removable face plate carried by a flange of said Z-shaped rib in spaced vertical parallel relation to said side wall with said plate being of a width greater than the flange of said rib so as to provide an over-lap portion, said over-lap portion having apertures formed throughout its vertical length, means removably carried by said face plate for detachably supporting freight retaining bars, said means including a plurality of U-shaped supporting members having spaced apart parallel arms extending laterally therefrom and inwardly and at right angles with respect to said side walls, each of said arms having apertures formed throughout its horizontal length with the apertures of each arm in vertical alignment with respect to each other, a dowel pin carried by the bight portion of the U-shaped member and extending in an opposite direction with respect to said arms thereof, an attaching hook carried by said bight portion of said U-shaped member above and in vertical alignment with respect to said dowel pin, said hook and said dowel pin insertable through preselected apertures of said plate for removably attaching said bight portion of said U-shaped members in facial abutment with said face plate, latch fingers provided by said face plate in spaced relation with respect to the apertures formed therein and adapted to engage the top portion of the upper one of said arms of said supporting members when said hook and dowel pin thereof are inserted into any aperture of said plate for securing said member to said face plate, freight retaining bars having at corresponding opposite ends thereof depending pin members insertable into the apertures of said supporting members for removably latching the ends of said bars to said supporting members, said arms being spaced apart so that each of said arms can releasably support a retaining bar between said side walls with said bars in vertical confronting relation with respect to each other.

3. A freight hauling vehicle having side walls supported by vertically extending spaced apart Z-shaped structural ribs, a removable face plate carried by a flange of said Z-shaped rib in spaced vertical parallel relation to said side wall with said plate being of a width greater than the flange of said rib so as to provide an over-lap portion, said over-lap portion having apertures formed throughout its vertical length, means removably carried by said face plate for detachably supporting freight retaining bars, said means including a plurality of U-shaped supporting members having spaced apart parallel arms extending laterally therefrom and inwardly and at right angles with respect to said side walls, each of said arms having apertures formed throughout its horizontal length with the apertures of each arm in vertical alignment with respect to each other, a dowel pin carried by the bight portion of the U-shaped member and extending in an opposite direction with respect to said arms thereof, an attaching hook carried by said bight portion of said U-shaped member above and in vertical alignment with respect to said dowel pin, said hook and said dowel pin insertable through preselected apertures of said plate for removably attaching said bight portion of said U-shaped members in facial abutment with said face plate, means on the ends of said members cooperating with the ends of other members to provide a connection therebetween to form a continuous supporting member throughout the length of said vehicle when said members are removably connected to said face plates removably carried by said ribs, freight retaining bars having at corresponding opposite ends thereof depending pin members insertable into the apertures of said supporting members for removably latching the ends of said bars to said supporting members, said arms being spaced apart so that each of said arms can releasably support a retaining bar between said side walls with said bars in vertical confronting relation with respect to each other.

4. A freight hauling vehicle having side walls supported by vertically extending spaced apart Z-shaped structural ribs, a removable face plate carried by a flange of said Z-shaped rib in spaced vertical parallel relation to said side wall with said plate being of a width greater than the flange of said rib so as to provide an over-lap portion, said over-lap portion having apertures formed throughout its vertical length, means removably carried by said face plate for detachably supporting freight retaining bars, said means including a plurality of U-shaped supporting members having spaced apart parallel arms extending laterally therefrom and inwardly and at right angles with respect to said side walls, each of said arms having apertures formed throughout its horizontal length with the apertures of each arm in vertical alignment with respect to each other, a dowel pin carried by the bight portion of the U-shaped member and extending in an opposite direction with respect to said arms thereof, an attaching hook carried by said bight portion of said U-shaped member above and in vertical alignment with respect to said dowel pin, said hook and said dowel pin insertable through preselected apertures of said plate for removably attaching said bight portion of said U-shaped members in facial abutment with said face plate, means on the ends of said members cooperating with the ends of other members to provide a connection therebetween to form a continuous supporting member throughout the length of said vehicle when said members are removably connected to said face plates removably carried by said ribs, said last mentioned means including tongue and groove connections at each end of the bight portions of said U-shaped supporting members, freight retaining bars having at corresponding opposite ends thereof depending pin members insertable into the apertures of said supporting members for removably latching the ends of said bars to said supporting members, said arms being spaced apart so that each of said arms can releasably support a retaining bar between said side walls with said bars in vertical confronting relation with respect to each other.

5. A freight hauling vehicle having side walls supported by vertically extending spaced apart Z-shaped structural ribs, a removable face plate carried by a flange of said Z-shaped rib in spaced vertical parallel relation to said side wall with said plate being of a width greater than the flange of said rib so as to provide an over-lap portion, said over-lap portion having apertures formed throughout its vertical length, means removably carried by said face plate for detachably supporting freight retaining bars, said means including a plurality of U-shaped supporting members having spaced apart parallel arms extending laterally therefrom and inwardly and at right angles with respect to said side walls, each of said arms having apertures formed throughout its horizontal length with the apertures of each arm in vertical alignment with respect to each other, a dowel pin carried by the bight portion of the U-shaped member and extending in an opposite direction with respect to said arms thereof, an attaching hook carried by said bight portion of said U-shaped member above and in vertical alignment with respect to said dowel pin, said hook and said dowel pin insertable through preselected apertures of said plate for removably attaching said bight portion of said U-shaped members in facial abutment with said face plate.

latch fingers provided by said face plate in spaced relation with respect to the apertures formed therein and adapted to engage the top portion of the upper one of said arms of said supporting members when said hook and dowel pin thereof are inserted into any aperture of said plate for securing said member to said face plate, means on the ends of said members cooperating with the ends of other members to provide a connection therebetween to form a continuous supporting member throughout the length of said vehicle when said members are removably connected to said face plates removably carried by said ribs, freight retaining bars having at corresponding opposite ends thereof depending pin members insertable into the apertures of said supporting members for removably latching the ends of said bars to said supporting members, said arms being spaced apart so that each of said arms can releasably support a retaining bar between said side walls with said bars in vertical confronting relation with respect to each other.

6. A freight hauling vehicle having side walls supported by vertically extending spaced apart Z-shaped structural ribs, a removable face plate carried by a flange of said Z-shaped rib in spaced vertical parallel relation to said side wall with said plate being of a width greater than the flange of said rib so as to provide an over-lap portion, said over-lap portion having apertures formed throughout its vertical length, means removably carried by said face plate for detachably supporting freight retaining bars, said means including a plurality of U-shaped supporting members having spaced apart parallel arms extending laterally therefrom and inwardly and at right angles with respect to said side walls, each of said arms having apertures formed throughout its horizontal length with the apertures of each arm in vertical alignment with respect to each other, a dowel pin carried by the bight portion of the U-shaped member and extending in an opposite direction with respect to said arms thereof, an attaching hook carried by said bight portion of said U-shaped member above and in vertical alignment with respect to said dowel pin, said hook and said dowel pin insertable through preselected apertures of said plate for removably attaching said bight portion of said U-shaped members in facial abutment with said face plate, latch fingers provided by said face plate in spaced relation with respect to the apertures formed therein and adapted to engage the top portion of the upper one of said arms of said supoprting members when said hook and dowel pin thereof are inserted into any aperture of said plate for securing said member to said face plate, means on the ends of said members cooperating with the ends of other members to provide a connection therebetween to form a continuous supporting member throughout the length of said vehicle when said members are removable connected to said face plates removably carried by said ribs, said last mentioned means including tongue and groove connection at each end of the bight portions of said U-shaped supporting members, freight retaining bars having at corresponding opposite ends thereof depending pin members insertable into the apertures of said supporting members for removably latching the ends of said bars to said supporting members, said arms being spaced apart so that each of said arms can releasably support a retaining bar between said side walls with said bars in vertical confronting relation with respect to each other.

References Cited in the file of this patent

UNITED STATES PATENTS

| | | |
|---|---|---|
| 2,091,869 | McCurdy | Aug. 31, 1937 |
| 2,440,437 | Fahland | Apr. 27, 1948 |
| 2,467,681 | McKinney | Apr. 19, 1949 |
| 2,468,101 | Nampa | Apr. 26, 1949 |
| 2,514,229 | Fahland | July 4, 1950 |
| 2,519,846 | Nampa | Aug. 22, 1950 |
| 2,567,658 | Stough | Sept. 1, 1951 |
| 2,613,615 | Nampa | Oct. 14, 1952 |
| 2,679,214 | Nampa | May 25, 1954 |
| 2,725,826 | Tobin et al. | Dec. 6, 1955 |